(12) United States Patent
Matsuura

(10) Patent No.: US 10,505,355 B2
(45) Date of Patent: Dec. 10, 2019

(54) ELECTRICAL JUNCTION BOX

(71) Applicant: SUMITOMO WIRING SYSTEMS, LTD., Mie (JP)

(72) Inventor: Daisuke Matsuura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/310,722

(22) PCT Filed: May 31, 2017

(86) PCT No.: PCT/JP2017/020204
§ 371 (c)(1),
(2) Date: Dec. 17, 2018

(87) PCT Pub. No.: WO2017/221648
PCT Pub. Date: Dec. 28, 2017

(65) Prior Publication Data
US 2019/0181627 A1    Jun. 13, 2019

(30) Foreign Application Priority Data

Jun. 21, 2016 (JP) ................................. 2016-122425

(51) Int. Cl.
*H02G 3/16* (2006.01)
*H01R 13/447* (2006.01)
(Continued)

(52) U.S. Cl.
CPC ................. *H02G 3/16* (2013.01); *H01R 9/18* (2013.01); *H01R 9/223* (2013.01); *H01R 13/447* (2013.01); *H02G 3/081* (2013.01); *H02G 3/14* (2013.01)

(58) Field of Classification Search
CPC . H02G 3/16; H02G 3/14; H02G 3/081; H01R 13/447; H01R 9/18; H01R 9/223
See application file for complete search history.

(56) References Cited

U.S. PATENT DOCUMENTS

| 6,679,708 B1 * | 1/2004 | Depp | H01R 9/2466 361/752 |
| 7,361,841 B1 * | 4/2008 | Smolen | H01R 4/70 174/135 |

(Continued)

FOREIGN PATENT DOCUMENTS

| JP | 10-164732 | 6/1998 |
| JP | 2001-155798 | 6/2001 |

(Continued)

OTHER PUBLICATIONS

Official Communication issued in International Bureau of WIPO Patent Application No. PCT/JP2017/020204, dated Jul. 4, 2017.

*Primary Examiner* — Zachary Pape
(74) *Attorney, Agent, or Firm* — Greenblum & Bernstein, P.L.C.

(57) ABSTRACT

Provided is an electrical junction box with which it is possible to reliably prevent exposure to the outside of the entire L-shaped terminal that is fastened to a stud bolt conductively connected to a conductive member of a box body even when an upper cover is removed, while making it easier to fasten the L-shaped terminal to the stud bolt. A terminal cover is hingedly connected to a box body, is pivotable about hinge portions between an open state and a closed state, and includes a top cover that covers a bolt fastening portion, and a side cover that covers a wire connection portion. The side cover includes a front-surface cover wall that covers a wire connection portion from an outer circumference side of a first peripheral wall portion, and a side-surface cover wall that covers a front side surface of two side surfaces of the wire connection portion.

4 Claims, 6 Drawing Sheets

(51) Int. Cl.
    *H02G 3/08*     (2006.01)
    *H01R 9/22*     (2006.01)
    *H01R 9/18*     (2006.01)
    *H02G 3/14*     (2006.01)

(56) References Cited

U.S. PATENT DOCUMENTS

| | | | | |
|---|---|---|---|---|
| 7,442,099 | B2 * | 10/2008 | Egawa | H01R 4/34 |
| | | | | 439/76.2 |
| 8,350,151 | B2 * | 1/2013 | Asao | H01R 13/6315 |
| | | | | 174/50 |
| 8,887,934 | B2 * | 11/2014 | Akahori | B60R 16/0238 |
| | | | | 220/3.7 |
| 9,231,330 | B2 * | 1/2016 | Tashiro | B60R 16/0238 |
| 9,979,170 | B1 * | 5/2018 | Nakano | B60R 16/0215 |
| 10,131,297 | B1 * | 11/2018 | Kakimi | B60R 16/0238 |
| 2019/0199018 | A1 * | 6/2019 | Tsuchiya | H01R 11/284 |
| 2019/0229439 | A1 * | 7/2019 | Matsuura | B60R 16/02 |

FOREIGN PATENT DOCUMENTS

| | | |
|---|---|---|
| JP | 2003-009351 | 1/2003 |
| JP | 2010-110131 | 5/2010 |

* cited by examiner

ELECTRICAL JUNCTION BOX

TECHNICAL FIELD

The present invention relates to an electrical junction box that includes a terminal attachment portion to which an L-shaped terminal provided at a wire end is attached.

BACKGROUND ART

Conventionally, an electrical junction box for use in an automobile electric/electronic system includes a box body that accommodates conductive members such as a bus bar forming an electric circuit, and there is known a structure in which a terminal attachment portion to which an L-shaped terminal provided at an end of a power-feeding external wire is provided in a portion of the box body. For example, JP 2001-155798A (Patent Document 1) proposes a structure including a terminal attachment portion in which a stud bolt that is conductively connected to the conductive member is provided protruding from the upper surface of the box body, and the L-shaped terminal is bolted and is fastened to the stud bolt.

Meanwhile, the L-shaped terminal has a structure in which a connection portion that has a bolt insertion hole is formed at the distal end portion of a metal piece that is bent in a substantially L-shape, and a crimping portion provided on the proximal end portion side is crimped to a core wire exposed at the wire end, as described in Patent Document 1. Therefore, when the stud bolt is passed through the bolt insertion hole, and the connection portion of the L-shaped terminal is fastened to the stud bolt protruding from the upper surface of the box body, the proximal end side of the L-shaped terminal and the crimping portion are disposed and exposed on the surface of a peripheral wall portion of the box body, and leaking of a current due to water exposure may occur, for example. For this reason, a structure as described in Patent Document 1 has been adopted in which a bolt fastening terminal is attached to a terminal cover made of a synthetic resin, and the proximal end side of the bolt fastening terminal and the crimping portion are covered by the terminal cover.

However, with an electrical junction box that has the conventional structure, the connection portion of the bolt fastening terminal protrudes and is exposed from the terminal cover. Accordingly, if the upper cover of the box body covering such an exposed portion falls off/comes loose or is broken, there is a risk of an electrical shock occurring when the exposed portion is touched. During mounting to a vehicle, the operation of inserting the L-shaped terminal at the wire end into the terminal cover, and attaching the wire equipped with the L-shaped terminal to the box body with the terminal cover attached to the L-shaped terminal is complicated. In addition, a terminal cover that has been removed from the L-shaped terminal may be lost while the vehicle undergoes maintenance, and, therefore, there is a need for further improvement.

CITATION LIST

Patent Document

Patent Document 1: JP 2001-155798A

SUMMARY OF INVENTION

Technical Problem

The present invention has been made in light of the above-described circumstances, and a problem to be solved by the invention is to provide an electrical junction box with a novel structure with which it is possible to reliably prevent exposure to the outside of the entire L-shaped terminal that is fastened to a stud bolt conductively connected to a conductive member of a box body even when an upper cover is removed, while making it easier to fasten the L-shaped terminal to the stud bolt.

Solution to Problem

A first aspect of the present invention is directed to an electrical junction box including: a box body in which a conductive member forming a part of an electric circuit is accommodated; a terminal attachment portion including a stud bolt that is provided protruding from an upper surface of the box body and is conductively connected to the conductive member; and a terminal cover that is made of a synthetic resin and is configured to cover an L-shaped terminal provided at a wire end of an external wire that is to be attached to the terminal attachment portion, the L-shaped terminal being a terminal in which a connection portion that has a bolt insertion hole is formed at a distal end portion of a metal piece that is bent in an L-shape, and a wire connection portion that is to be connected to the wire end is formed on a proximal end portion side of the metal piece, the L-shaped terminal being configured such that the connection portion of the L-shaped terminal is bolted and is fastened to the stud bolt in a state in which the stud bolt is passed through the bolt insertion hole of the L-shaped terminal, and that the L-shaped terminal is attached to the terminal attachment portion in a state in which the wire connection portion of the L-shaped terminal is disposed on a first peripheral wall portion side of the box body, wherein the terminal cover is hingedly connected to the box body via a hinge portion extending in a direction orthogonal to the first peripheral wall portion of the box body, and the terminal cover is pivotable about the hinge portion between an open state in which the terminal attachment portion is exposed to the outside, and a closed state in which the terminal attachment portion is covered, the terminal cover includes a top cover configured to cover a bolt fastening portion of the connection portion between the stud bolt and the L-shaped terminal, and a side cover configured to cover the wire connection portion of the L-shaped terminal, the side cover includes: a front-surface cover wall configured to cover the wire connection portion of the L-shaped terminal from an outer circumference side of the first peripheral wall portion; a side-surface cover wall configured to cover a front side surface of two side surfaces of the wire connection portion, the front side surface being located spaced apart from the hinge portion; and an opening portion configured to prevent interference between the side cover and the L-shaped terminal when the terminal cover is pivoted about the hinge portion, and a protruding wall portion configured to cover the opening portion of the terminal cover located in the closed state is provided protruding from the first peripheral wall portion of the box body.

According to this aspect, the terminal cover configured to cover the L-shaped terminal that is to be attached to the terminal attachment portion is hingedly connected to the box body, and the terminal cover is pivotable about the hinge portion between the open state in which the terminal attachment portion is exposed to the outside, and the closed state in which the terminal attachment portion is covered. Therefore, the terminal cover can be opened and closed without the risk of losing the terminal cover. Moreover, it is possible to switch between the open state and the closed state with a simple operation of pivoting the terminal cover about the hinge portion. Accordingly, the L-shaped terminal can be easily fastened to the stud bolt as compared with when the L-shaped terminal is bolted and is fastened to the stud bolt after attaching the terminal cover to the L-shaped terminal as in the conventional structure, thus improving the operability in fastening of the L-shaped terminal when mounting the electrical junction box to the vehicle or when carrying out maintenance.

Moreover, the terminal cover includes the top cover configured to cover the bolt fastening portion of the connection portion between the stud bolt and the L-shaped terminal, and the side cover configured to cover the wire connection portion of the L-shaped terminal. Accordingly, even when the upper cover of the box body is removed, the bolt fastening portion of the connection portion between the stud bolt and the L-shaped terminal will not be exposed, thus preventing the risk of an electrical shock. In addition, the side cover of the terminal cover also reliably covers the wire connection portion disposed on the first peripheral wall portion side of the box body at the L-shaped terminal attached to the terminal attachment portion, and a problem such as leaking of a current due to water exposure is also prevented. Furthermore, the positions of the top cover and the side cover can be changed between the open state and the closed state with a single pivoting operation, thus further improving the operability.

In addition, in order to enable the opening/closing operation of the top cover and the side cover with a single pivoting operation, in the terminal cover that is hingedly connected about the hinge portion extending in a direction orthogonal to the first peripheral wall portion, it is necessary to prevent interference between the side cover and the terminal attachment portion of the L-shaped terminal disposed on the first peripheral wall portion side, and the opening portion for preventing such an interference is provided in the side cover. The rear side surface of two side surfaces of the wire connection portion of the L-shaped terminal that is located in proximity to the hinge portion is exposed to the outside through the opening portion. In this respect, the protruding wall portion configured to cover the opening portion of the terminal cover in the closed state is provided protruding from the first peripheral wall portion of the box body. Accordingly, the L-shaped terminal is covered by the protruding wall portion, and thus is prevented from being exposed to the outside of the rear side surface through the opening portion. Accordingly, it is possible to successfully achieve both good operability in fastening of the L-shaped terminal to the terminal attachment portion, and the covering of the entire L-shaped terminal attached to the terminal attachment portion.

A second aspect of the present invention is directed to the electrical junction box according to the first aspect, wherein a lock portion configured to allow the terminal cover located in the closed state to be detachably fitted to a locked portion provided on the box body is formed on the top cover of the terminal cover.

According to this aspect, the terminal cover can be reliably lock-fitted into the closed state. Accordingly, it is possible to prevent the terminal cover from accidentally coming off/loose when the upper cover is removed during maintenance or the like, and the risk of an electrical shock can be more reliably reduced.

A third aspect of the present invention is directed to the electrical junction box according to the first or second aspect, wherein the protruding wall portion provided protruding from the first peripheral wall portion is formed using a wall portion of another functional member provided at the first peripheral wall portion.

According to this aspect, the protruding wall portion is formed using a wall portion of another functional member provided on the first peripheral wall portion. A functional member such as a bracket attachment portion or a lock-fitting portion is often provided protruding from a peripheral wall portion of the electrical junction box. By using a wall portion of such a functional member to form the protruding wall portion, it is possible to reduce the size of and the materials used for the electrical junction box.

A fourth aspect of the present invention is directed to the electrical junction box according to any one of the first to third aspects, including an upper cover configured to cover an upper opening portion of the box body, wherein a side cover covering portion including three wall portions configured to cover, from the outside, the front-surface cover wall, the side-surface cover wall, and the opening portion, respectively, of the side cover of the terminal cover is provided in the upper cover.

According to this aspect, the wire connection portion (the placement region on the first peripheral wall portion side) of the L-shaped terminal is double covered by the side cover covering portion of the upper cover and the side cover of the terminal cover. In particular, the side cover covering portion includes three wall portions configured to cover, from the outside, the front-surface cover wall, the side-surface cover wall, and the opening portion, respectively, of the side cover of the terminal cover. Accordingly, the side cover can be stably covered with sufficient rigidity, and the reliability of covering by the side cover for the opening portion can also be increased.

Advantageous Effects of Invention

According to the present invention, the terminal cover that covers the L-shaped terminal is hingedly connected to the box body, and the terminal cover is pivotable about the hinge portion between the open state and the closed state. Therefore, there is no risk of losing the terminal cover. Moreover, it is possible to switch between the open state and the closed state with a simple operation of pivoting the terminal cover about the hinge portion, thus improving the operability in fastening of the L-shaped terminal when mounting the electrical junction box to the vehicle or when carrying out maintenance. Moreover, the terminal cover includes the top cover and the side cover. Accordingly, even when the upper cover of the box body is removed, the bolt fastening portion of the connection portion between the stud bolt and the L-shaped terminal will not be exposed, thus preventing the risk of an electrical shock. In addition, the side cover of the terminal cover also reliably covers the wire connection portion. Furthermore, the positions of the top cover and the side cover can be changed between the open state and the closed state with a single pivoting operation, thus further improving the operability. In order to enable the opening/closing operation of the top cover and the side cover with a single pivoting operation, the opening portion is provided in the side cover. Here, the L-shaped terminal is covered by the protruding wall portion, and is thus prevented from being exposed to the outside of the rear side surface through the opening portion. Accordingly, it is possible to successfully achieve both good operability in fastening of the L-shaped terminal to the terminal attachment portion, and the covering of the entire L-shaped terminal attached to the terminal attachment portion.

DESCRIPTION OF EMBODIMENTS

Figure 1:
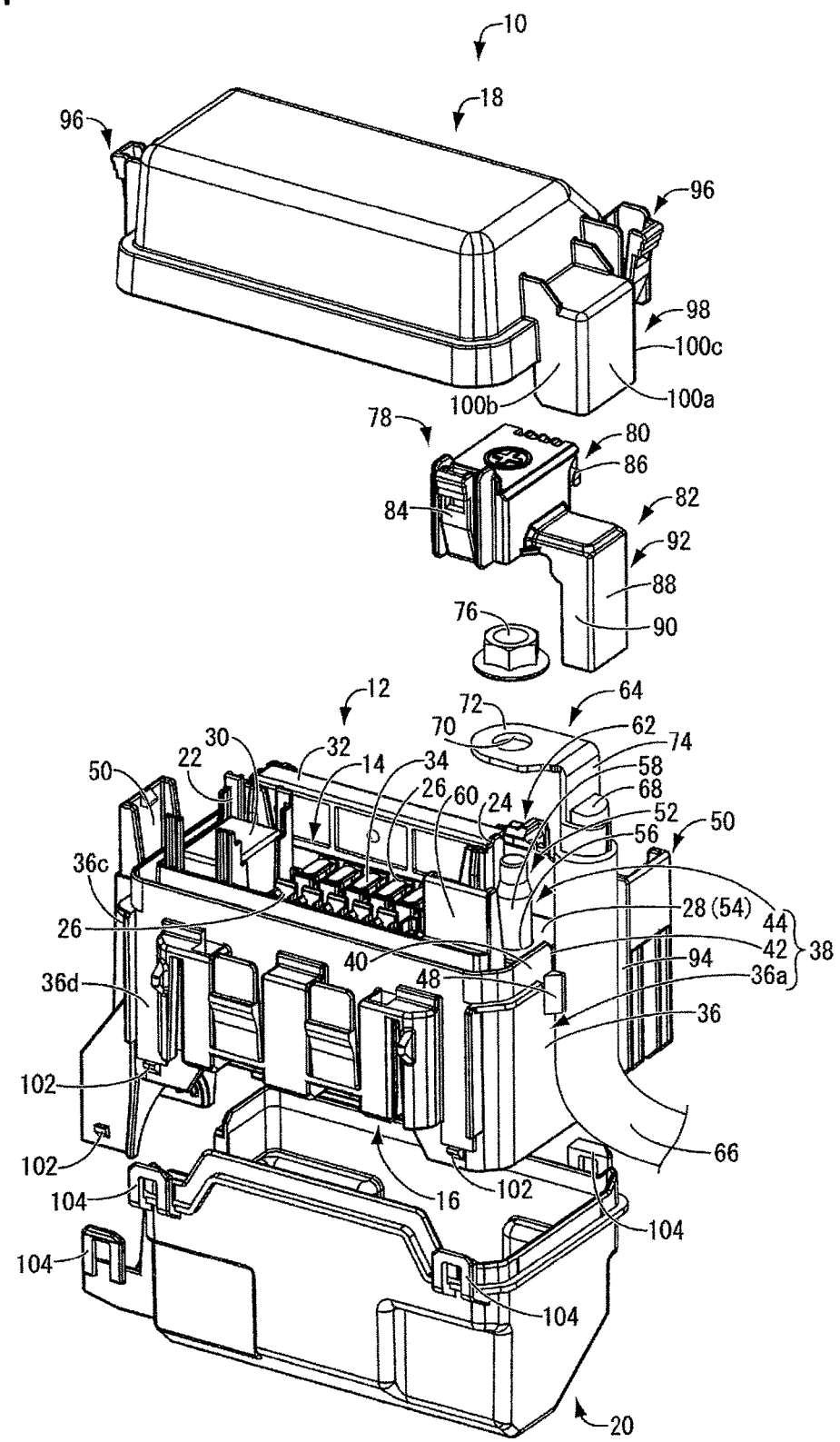
FIG. 1 is an exploded perspective view showing an electrical junction box according to an embodiment of the present invention.

Hereinafter, an embodiment of the present invention will be described with reference to the drawings.

FIGS. 1 to 7 show an electrical junction box 10 according to one embodiment of the present invention. The electrical junction box 10 includes a box body 12, and an upper cover 18 and a lower cover 20 that cover an upper surface 14 and a lower surface 16, respectively, of the box body 12. In the following description, "upward" refers to upward in FIG. 1, "downward" refers to downward in FIG. 1, "forward" refers to left in FIG. 1, and "rearward" refers to right in FIG. 1.

Figure 5:
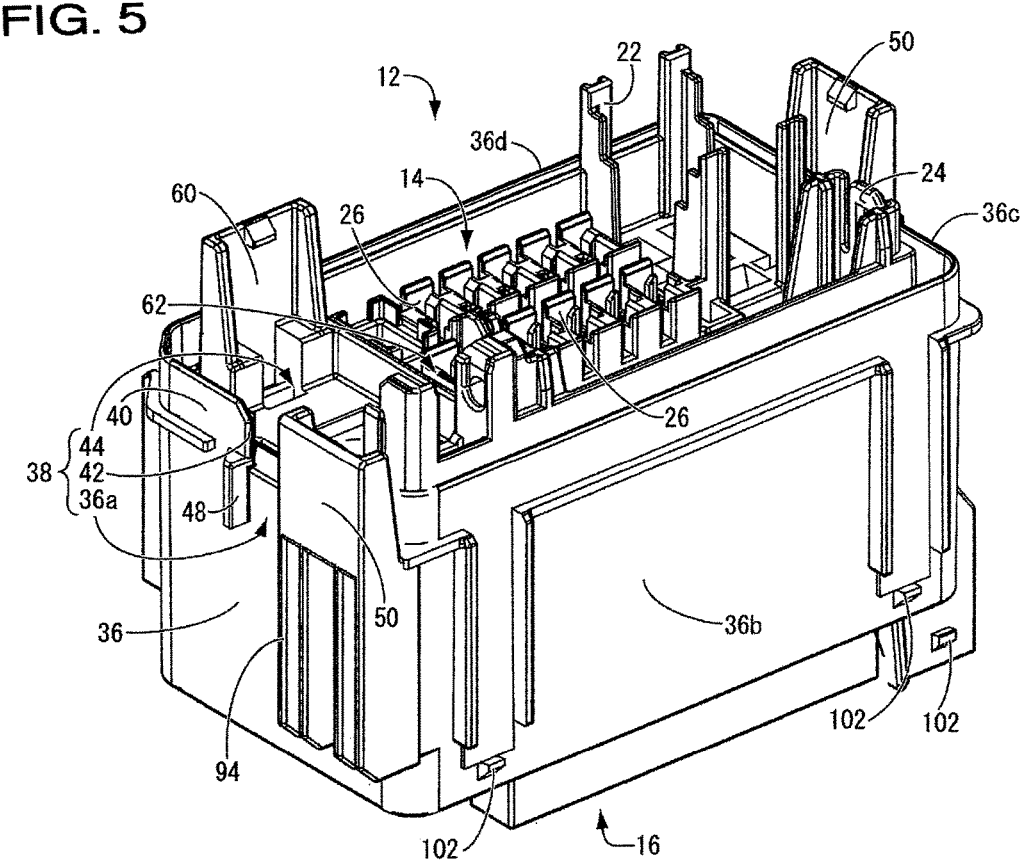
FIG. 5 is a perspective view of a box body as shown in FIG. 1, as viewed from a different direction (with various parts not attached).
Figure 6:
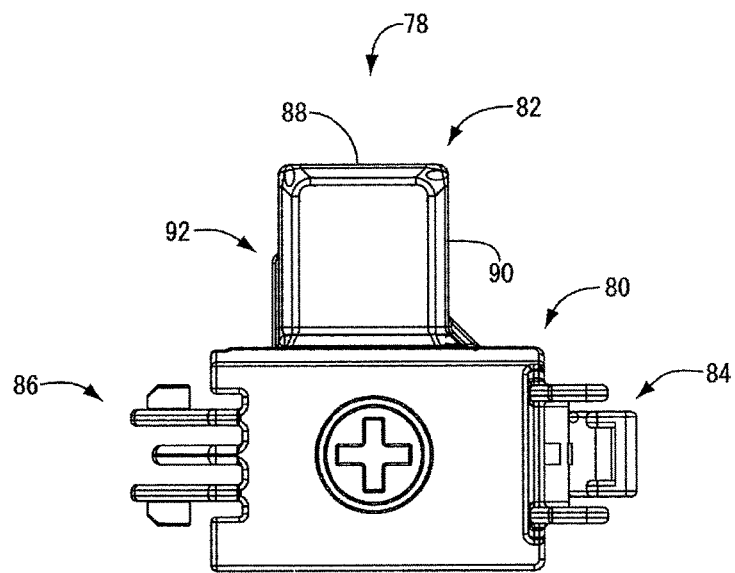
FIG. 6 is a plan view of the terminal cover shown in FIG. 1.

The box body 12 has the shape of an overall elongated rectangular block, and is formed in one piece through injection molding or the like using an insulating synthetic resin such as polypropylene (PP) or polyamide (PA). As shown in FIG. 5, a relay attachment portion 22, a resistor attachment portion 24, and a plurality of fuse attachment portions 26 are formed open upward on the upper surface 14 of the box body 12. Although not shown, a plurality of terminal accommodating holes are formed open downward in the lower surface 16 of the box body 12. That is, crimped terminals or the like that are crimped to ends of wires serving as conductive members are accommodated in the terminal accommodating holes, and a bus bar 28 (see FIG. 1) or the like serving as a conductive member forming a part of an electric circuit is attached and supported in a bus bar accommodating groove or the like.

Figure 3:
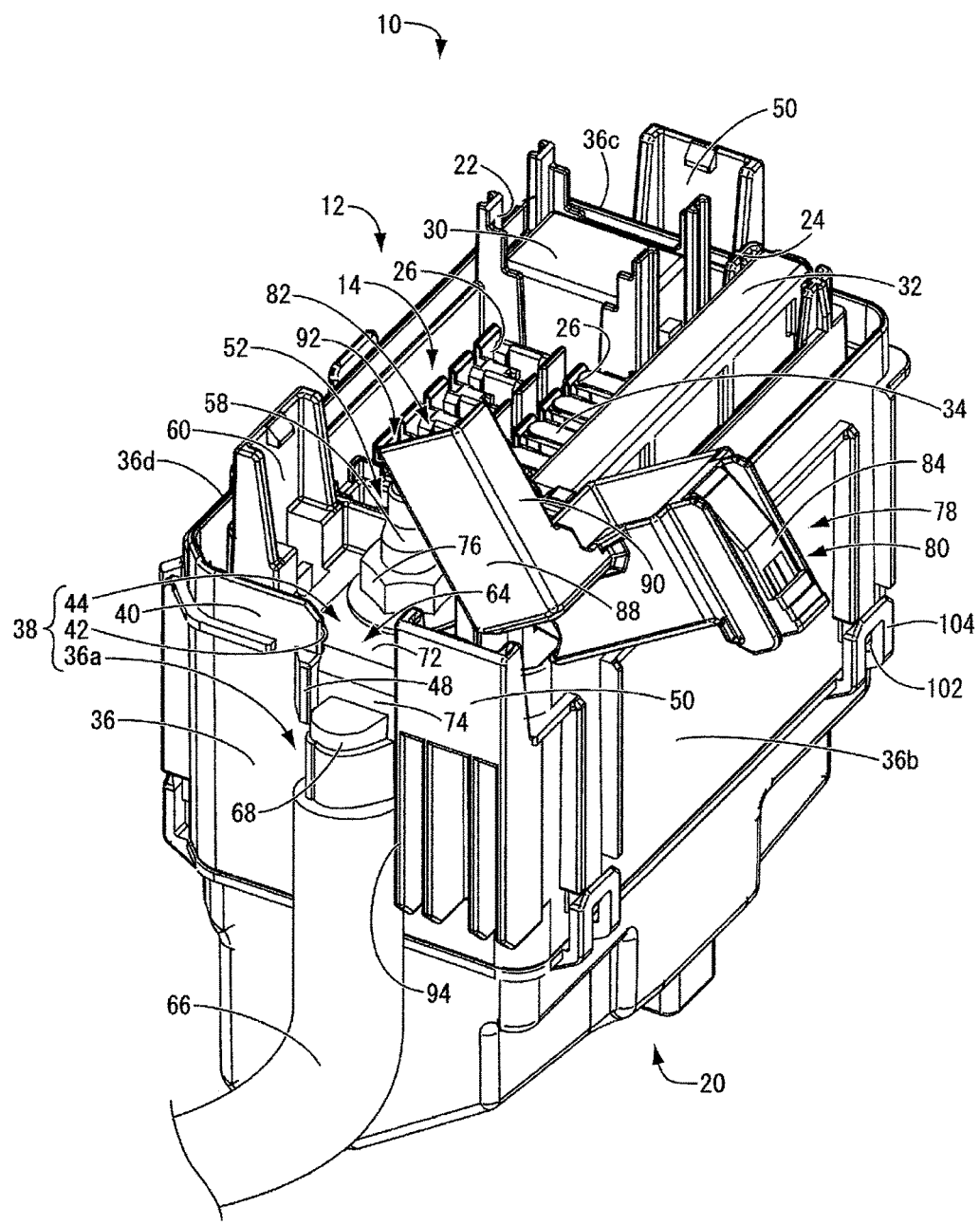
FIG. 3 is a perspective view of the electrical junction box shown in FIG. 2, in which an upper cover is removed and a terminal cover is brought into an open state.
Figure 4:
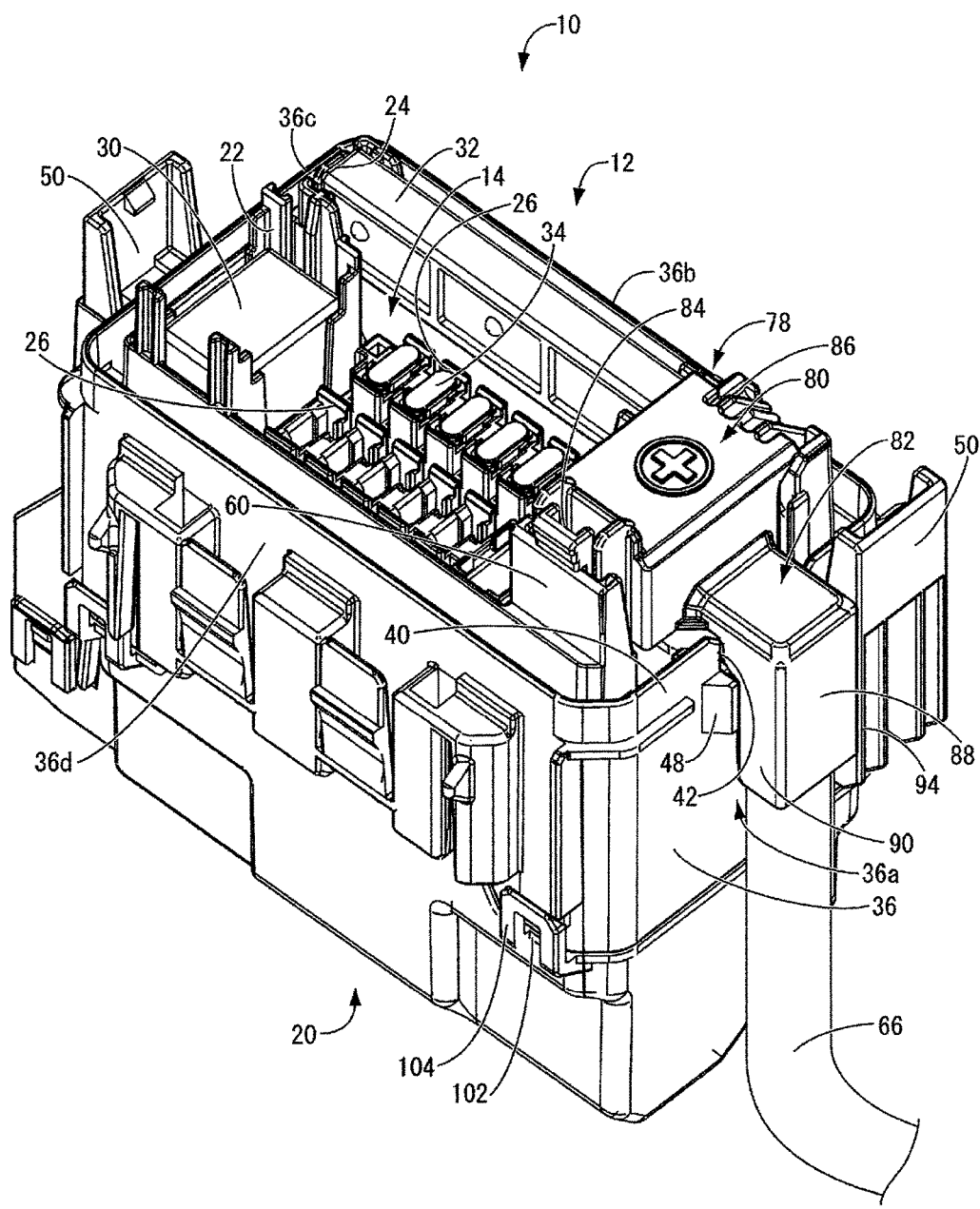
FIG. 4 is a perspective view in which the terminal cover shown in FIG. 3 is brought into a closed state.

As shown in FIGS. 1, 3, and 4, a relay 30, a resistor 32, and fuses 34 are attached to the relay attachment portion 22, the resistor attachment portion 24, and the fuse attachment portions 26, respectively, from the upper surface 14 side of the box body 12. Consequently, tab terminals (not shown) protruding from the relay 30, the resistor 32, and the fuses 34 are conductively connected to the crimped terminals and the bus bar 28 or the like at the ends of the wires described above.

A peripheral wall portion 36 extending in a vertical direction for the entire circumference thereof to have the shape of a substantially rectangular tube is provided at a peripheral edge portion of the box body 12. As shown in FIGS. 1 to 5, a terminal attachment portion 38 is provided at a circumferentially central part of a first peripheral wall portion 36a that is located on the rear side of the peripheral wall portion 36. More specifically, the terminal attachment portion 38 includes: the first peripheral wall portion 36a; a cut-out portion 42 that has a substantially rectangular shape in rear view and is open upward and in the front-rear direction, the cut-out portion 42 being formed by making a vertical cutout in a protruding end portion 40 protruding upward from a portion of the first peripheral wall portion 36a that is located on the upper surface 14 side of the box body 12; and a stud bolt attachment portion 44 that is formed on the upper surface 14 of the box body 12 adjacent to the cut-out portion 42, and to which an L-shaped terminal 64, which will be described later, is attached. In addition, guide portions extending downward from lower end portions on circumferentially opposite sides of the cut-out portion 42 are provided at a circumferentially central part of the first peripheral wall portion 36a adjacent to the cut-out portion 42. The guide portions include a guide rib 48 extending downward on one circumferential side (the left side in FIG. 3) of the cut-out portion 42 so as to have a substantially trapezoidal cross-sectional shape, and a locked portion 50 for fitting the upper cover 18 to the box body 12, the locked portion 50 extending downward on the other circumferential side (the right side in FIG. 3) of the cut-out portion 42.

At the stud bolt attachment portion 44 forming a part of the terminal attachment portion 38, a stud bolt 52 is provided protruding from the upper surface 14 of the box body 12, with its head portion (not shown) being fitted into a bolt accommodating hole (not shown). As shown in FIG. 1, a bus bar terminal 54 of the bus bar 28 is placed so as to allow the stud bolt 52 to pass therethrough. More specifically, the bus bar 28 is a plate made by punching a conductive metal plate or the like, and includes, at its distal end portion, a bus bar terminal 54 that has a bolt insertion hole 56, and the bus bar terminal 54 is formed bent at a substantially right angle. Then, by placing the bolt insertion hole 56 so as to allow a screw shaft portion 58 of the stud bolt 52 to pass therethrough, the bus bar terminal 54 of the bus bar 28 is placed on the head portion, while allowing the screw shaft portion 58 of the stud bolt 52 to pass therethrough. Then, as shown in FIGS. 1, 3, and 4, the L-shaped terminal 64 provided at a wire end of an external wire 66, which will be described later, is attached to the terminal attachment portion 38, and a terminal cover 78 that is made of a synthetic resin and covers the L-shaped terminal 64 is also attached thereto.

In addition, as shown in FIG. 5, a substantially plate-shaped locked portion 60 is provided protruding on one side (the back side in FIG. 5) of a peripheral edge portion of the stud bolt attachment portion 44, and a hinge portion 62 is formed on the other side (the front side in FIG. 5) of the peripheral edge portion of the stud bolt attachment portion 44 by a pair of substantially prismatic members that are spaced apart in the length direction and have depressed portions on their opposing surfaces.

As shown in FIG. 1, the L-shaped terminal 64 is used in a state in which it is connected to a core wire 68 exposed at the end of the external wire 66. More specifically, the external wire 66 has a structure in which a core wire 68 formed by binding together a plurality of metal wires made of copper, aluminum or the like serving as a conductor is covered with an insulating covering that has electrical insulation such as an ethylene-based resin or a styrene-based resin. On the other hand, the L-shaped terminal 64 is constituted by a metal piece that is bent into an L-shape, and a connection portion 72 that has a bolt insertion hole 70 is formed at the distal end portion. A wire connection portion 74 to which the core wire 68 extending from the end of the external wire 66 is crimped and connected is formed at a proximal end portion of the L-shaped terminal 64.

Then, as shown in FIGS. 1 and 3, in a state in which the bolt insertion hole 70 of the L-shaped terminal 64 to which the core wire 68 exposed at the end of the external wire 66 at the wire connection portion 74 is crimped and connected is placed, from above the box body 12, so as to allow the stud bolt 52 to pass therethrough, a nut 76 is attached from above the stud bolt 52, and, thereby, the connection portion 72 of the L-shaped terminal 64 is bolted and is fastened to the stud bolt 52. In addition, when placing the bolt insertion hole 70 of the L-shaped terminal 64, from above the box body 12, so as to allow the stud bolt 52 to pass therethrough, the external wire 66 that is connected to the wire connection portion 74 of the L-shaped terminal 64 is guided downward in the vertical direction by the guide portions 48 and 50 provided at the first peripheral wall portion 36a. As a result, as shown in FIG. 3, the wire connection portion 74 of the L-shaped terminal 64 can be disposed on the central side of the first peripheral wall portion 36a of the box body 12. Consequently, the L-shaped terminal 64 is attached to the first peripheral wall portion 36a, the cut-out portion 42, and the stud bolt attachment portion 44 that constitute the terminal attachment portion 38.

As shown in FIG. 1, the terminal cover 78 includes a top cover 80 that is open downward and has the shape of a substantially bottomed rectangular tube, and a side cover 82 that is bent in an L-shape and open downward and forward, and has the shape of a substantially rectangular trough that is connected to the rear surface of the top cover 80. A lock portion 84 that allows the terminal cover 78 located in a closed state, which will be described later, to be detachably fitted to the locked portion 60 provided on the box body 12 is formed on one side surface (the front side in FIG. 1) of the top cover 80. On the other hand, a hinge portion 86 that allows the terminal cover 78 to be hingedly coupled to the box body 12 by being fitted to the hinge portion 62 of the box body 12 is formed on the other side surface (the back side in FIG. 1) of the top cover 80 by a pair of substantially rod-shaped members that are spaced apart in the length direction (the vertical direction in FIG. 6) and have protrusions on surfaces spaced apart in the length direction.

Figure 7A:
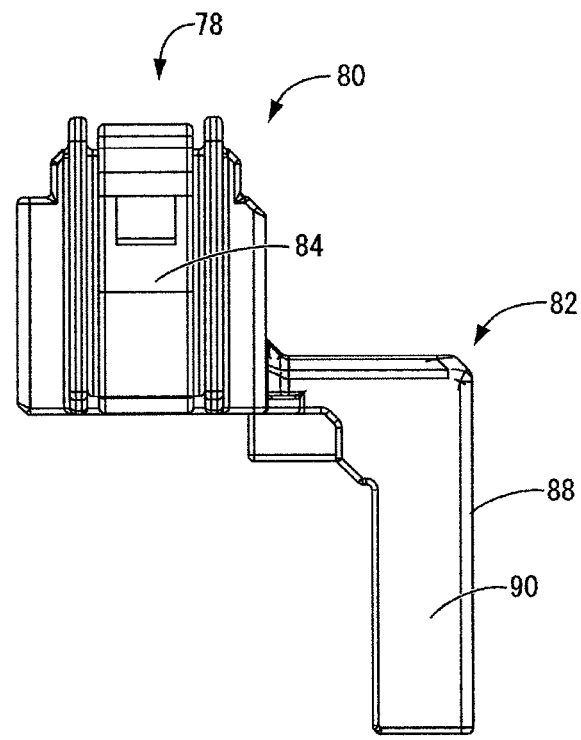
FIGS. 7(a) and 7(b) show side views of the terminal cover shown in FIG. 1 (FIG. 7(a) showing a right-side view, and FIG. 7(b) showing a left-side view).
Figure 7B:
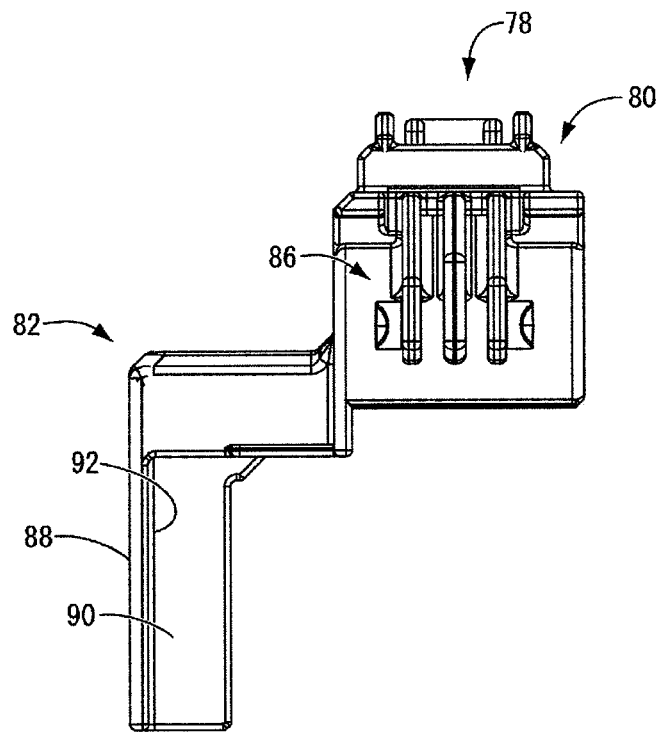

The side cover 82 includes: a downwardly extending, front-surface cover wall 88 that has a substantially vertically elongated rectangular shape in rear view, and constituting a bottom wall extending in a substantially trough-like shape; a downwardly extending, side-surface cover wall 90 that has a substantially vertically elongated rectangular shape in side view, and constituting one side wall (on the lock portion 84 side) extending in a substantially trough-like shape; and an opening portion 92 (see FIG. 7(b)) that is cut out into a substantially vertically elongated rectangular shape in side view, and is provided in a region extending downward of the other side wall (the hinge portion 86 side) extending in a substantially trough-like shape.

Then, as shown in FIG. 1, the hinge portion 86 of the terminal cover 78 is fitted to the hinge portion 62 of the box body 12 from above the box body 12, and, thus, the terminal cover 78 is hingedly connected to the box body 12 via the hinge portions 62 and 86. That is, the terminal cover 78 is hingedly connected to the box body 12 via the hinge portions 62 and 86 extending in the longitudinal direction (the lateral direction in FIG. 1) that is orthogonal to the first peripheral wall portion 36a of the box body 12. Consequently, the terminal cover 78 is pivotable about the hinge portions 62 and 86 between an open state (see FIG. 3) in which the terminal attachment portion 38 to which the L-shaped terminal 64 is attached is exposed to the outside, and a closed state (see FIG. 4) in which the terminal attachment portion 38 is covered.

As shown in FIGS. 3 and 4, in the closed state in which the terminal attachment portion 38 is covered, the top cover 80 of the terminal cover 78 is configured to cover the bolt fastening portion to which the connection portion 72 of the L-shaped terminal 64 is bolted and fitted to the stud bolt 52, and the side cover 82 of the terminal cover 78 is configured to cover the wire connection portion 74 of the L-shaped terminal 64. More particularly, the front-surface cover wall 88 of the side cover 82 is configured to cover the wire connection portion 74 of the L-shaped terminal 64 from the outer circumference side of the first peripheral wall portion 36a, and the side-surface cover wall 90 of the side cover 82 is configured to cover the front side surface of two side surfaces of the wire connection portion 74 of the L-shaped terminal 64 that is located spaced apart from the hinge portions 62 and 86. Moreover, the provision of the opening portion 92 on the side cover 82 makes it possible to prevent the side cover 82 of the terminal cover 78 from interfering with the wire connection portion 74 of the L-shaped terminal 64 when the terminal cover 78 is pivoted about the hinge portions 62 and 86. In addition, a protruding wall portion 94 that covers the entire length in the vertical direction of the opening portion 92 of the terminal cover 78 located in the closed state is provided protruding from the first peripheral wall portion 36a of the box body 12, the protruding wall portion 94 being formed using one vertically extending side wall (the opening portion 92 side) of the locked portion 50 serving as another functional member.

Figure 2:
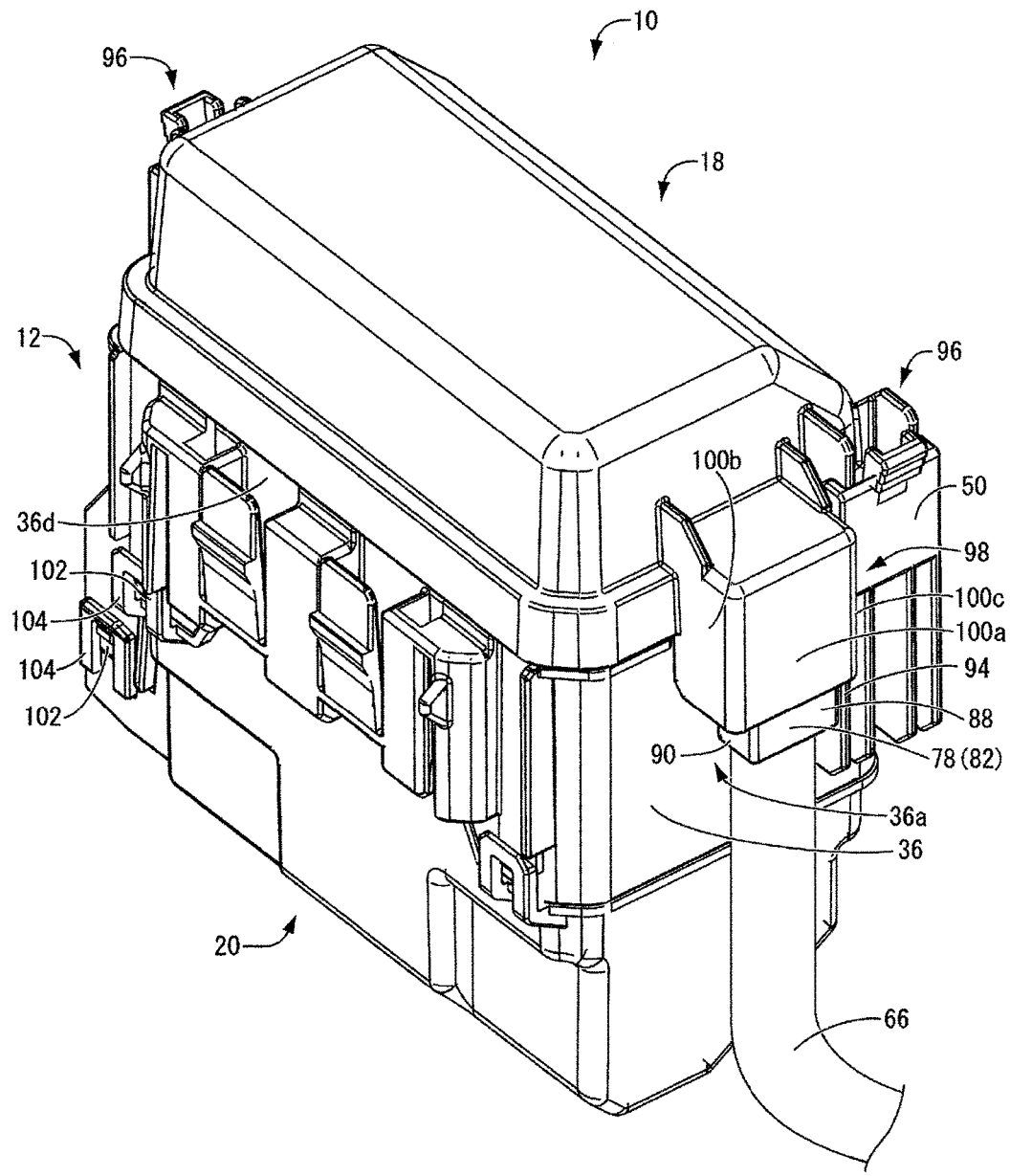
FIG. 2 is an overall perspective view of the electrical junction box shown in FIG. 1.

As a result of the L-shaped terminal 64 being attached to the terminal attachment portion 38 in this way, and the upper cover 18 and the lower cover 20 being mounted to the box body 12 that has been brought into a state in which the terminal cover 78 is assembled so as to cover the L-shaped terminal 64 (closed state), the electrical junction box 10 of the present embodiment is completed. More particularly, as shown in FIGS. 1 to 3, in the vicinity of an upper opening portion of the box body 12, locked portions 50 are provided protruding from first and third peripheral wall portions 36a and 36c of the peripheral wall portion 36 that oppose each other in the longitudinal direction of the box body 12. Meanwhile, the upper cover 18 that covers the upper opening portion of the box body 12 has a substantially box-like shape that is open downward, and also is formed in a substantially rectangular shape in plan view that is substantially the same shape as that of the upper surface 14 of the box body 12. For example, the upper cover 18 is formed in one piece through injection molding or the like using an insulating synthetic resin such as polypropylene (PP) or polyamide (PA). Lock portions 96 are provided protruding from peripheral wall portions of the upper cover 18 that oppose each other in the longitudinal direction. Due to the lock portions 96 being fitted to the respective locked portions 50 of the box body 12, the upper surface 14 of the box body 12 can be locked in the covered state by the upper cover 18. In addition, a side cover covering portion 98 extending rearward and downward is provided in the peripheral wall portion of the upper cover 18 on the rear side (the right side in FIG. 1) at a lower end portion at the circumferentially central portion. As shown in FIGS. 2 and 4, the side cover covering portion 98 includes a first wall portion 100a that covers an upper portion of the front-surface cover wall 88 of the side cover 82 of the terminal cover 78 from the outside, a second wall portion 100b that covers the upper portion of the side-surface cover wall 90 from the outside, and a third wall portion 100c that covers an upper portion of the opening portion 92 from the outside, in a state in which the upper cover 18 covers the upper opening portion of the box body 12.

As shown in FIGS. 1 to 3, in the vicinity of a lower opening portion of the box body 12, lock portions 102 are provided protruding from second and fourth peripheral wall portions 36b and 36d of the peripheral wall portion 36 that oppose each other in the width direction of the box body 12. Meanwhile, the lower cover 20 that covers the lower opening portion of the box body 12 has a substantially box-like shape that is open upward, and also is formed in a substantially rectangular shape in bottom view that is substantially the same shape as that of the lower surface 16 of the box body 12. For example, the lower cover 20 is formed in one piece through injection molding or the like using an insulating synthetic resin such as polypropylene (PP) or polyamide (PA). Locked portions 104 are provided protruding from peripheral wall portions of the lower cover 20 that oppose each other in the width direction. As a result of the locked portions 104 being fitted to the respective locks portion 102 of the box body 12, the lower surface 16 of the box body 12 can be locked in the covered state by the lower cover 20.

With the electrical junction box 10 having this structure, the terminal cover 78 is hingedly connected to the box body 12 viat the hinge portions 62 and 86 extending in the longitudinal direction that is orthogonal to the first peripheral wall portion 36a of the box body 12. Consequently, the terminal cover 78 is pivotable about the hinge portions 62 and 86 between the open state in which the terminal attachment portion 38 to which the L-shaped terminal 64 is attached is exposed to the outside, and the closed state in which the terminal attachment portion 38 is covered. Accordingly, the terminal cover 78 can be opened and closed without the risk of losing the terminal cover 78. In addition, since it is possible to switch between the open state and the closed state with a simple operation of pivoting the terminal cover 78 about the hinge portions 62 and 86, the L-shaped terminal 64 can be easily bolted and fastened to the stud bolt 52 as compared with when the L-shaped terminal 64 is bolted and is fastened to the stud bolt 52 after attaching the terminal cover 78 to the L-shaped terminal 64 as in the conventional structure. Therefore, the operability in bolting and fastening of the L-shaped terminal 64 when mounting the electrical junction box 10 to a vehicle or during maintenance is improved. Furthermore, the lock portion 84 that allows the terminal cover 78 located in the closed state to be detachably fitted to the locked portion 60 provided on the box body 12 is provided on the terminal cover 78 of the present embodiment. Accordingly, it is possible to prevent the terminal cover 78 from being accidentally coming loose when the upper cover 18 is removed during maintenance or the like, and the risk of an electrical shock can be more reliably reduced.

Moreover, the terminal cover 78 is configured such that the top cover 80 of the terminal cover 78 covers the bolt fastening portion to which the connection portion 72 of the L-shaped terminal 64 is bolted and fastened in the closed state in which the terminal attachment portion 38 is covered. Accordingly, when the upper cover 18 is removed, the bolt fastening portion of the connection portion 72 between the stud bolt 52 and the L-shaped terminal 64 will not be exposed, thus preventing the risk an electrical shock. Since the side cover 82 of the terminal cover 78 is configured to cover the wire connection portion 74 of the L-shaped terminal 64, a problem such as leaking of a current due to water exposure is also prevented. Furthermore, the positions of the top cover 80 and the side cover 82 of the terminal cover 78 can be changed between the open state and the closed state with a single pivoting operation, thus further improving the operability.

In addition, in order to enable the opening/closing operation of the top cover 80 and the side cover 82 with a single pivoting operation, in the terminal cover 78 that is hingedly connected about the hinge portions 62 and 86 extending in a direction orthogonal to the first peripheral wall portion 36a of the box body 12, the opening portion 92 for preventing the interference between the side cover 82 and the L-shaped terminal 64 disposed on the first peripheral wall portion 36a side is provided in the side cover 82. In the closed state of the terminal cover 78, the opening portion 92 is covered by the protruding wall portion 94 provided protruding from the first peripheral wall portion 36a. Accordingly, the L-shaped terminal 64 is covered by the protruding wall portion 94, and thus is prevented from being exposed to the outside of the rear side surface of the wire connection portion 74 through the opening portion 92. Therefore, it is possible to successfully achieve both good operability in attaching of the L-shaped terminal 64 to the terminal attachment portion 38, and the covering of the entire L-shaped terminal 64 attached to the terminal attachment portion 38. Since the protruding wall portion 94 is formed using one side wall of the locked portion 50 serving as another functional member provided at the first peripheral wall portion 36a, it is possible to reduce the size of and the materials used for the electrical junction box 10.

Furthermore, the wire connection portion 74 of the L-shaped terminal 64 is double covered by the side cover covering portion 98 of the upper cover 18 and the side cover 82 of the terminal cover 78. Moreover, the side cover covering portion 98 includes the three wall portions 100a, 100b, and 100c that cover, from the outside, the front-surface cover wall 88, the side-surface cover wall 90, and the opening portion 92, respectively, of the side cover 82 of the terminal cover 78. Accordingly, the side cover 82 can be stably covered with sufficient rigidity, and the reliability of covering by the side cover 82 for the opening portion 92 can also be increased.

Although an embodiment of the present invention has been described above in detail, the invention is not intended to be limited by the specific description thereof. For example, the hinge portion in the above embodiment is formed by the hinge portion 86 of the terminal cover 78 and the hinge portion 62 of the box body 12 being fitted to each other. However, the box body 12 and the terminal cover 78 may be integrated via a hinge portion having a smaller thickness, for example. The protruding wall portion 94 in the above embodiment is formed using one side wall of the locked portion 50 serving as a functional member. However, the protruding wall portion 94 may be formed using any other functional member such as a bracket attachment portion or a lock-fitting portion, or may be formed without using any functional member. Although the locked portion 60 for locking the terminal cover 78 to the box body 12 and the side cover covering portion 98 that covers the side cover 82 of the terminal cover 78 are provided in the above embodiment, these may not be necessarily provided.

LIST OF REFERENCE NUMERALS

10: Electrical junction box
12: Box body
14: Upper surface

18: Upper cover
28: Bus bar (conductive member)
36a: First peripheral wall portion
38: Terminal attachment portion
50: Locked portion (other functional member)
52: Stud bolt
60: Locked portion
62: Hinge portion
64: L-shaped terminal
66: External wire
70: Bolt insertion hole
72: Connection portion
74: Wire connection portion
78: Terminal cover
80: Top cover
82: Side cover
84: Lock portion
86: Hinge portion
88: Front-surface cover wall
90: Side-surface cover wall
92: Opening portion
94: Protruding wall portion
98: Side cover covering portion
100a: First wall portion
100b: Second wall portion
100c: Third wall portion

The invention claimed is:

1. An electrical junction box comprising:
a box body in which a conductive member forming a part of an electric circuit is accommodated;
a terminal attachment portion including a stud bolt protruding from an upper surface of the box body and conductively connected to the conductive member; and
a terminal cover made of a synthetic resin and configured to cover an L-shaped terminal provided at a wire end of an external wire that is to be attached to the terminal attachment portion,
the L-shaped terminal being a terminal in which a connection portion that has a bolt insertion hole is formed at a distal end portion of a metal piece that is bent in an L-shape, and a wire connection portion that is to be connected to the wire end is formed on a proximal end portion side of the metal piece, the L-shaped terminal being configured such that the connection portion of the L-shaped terminal is bolted and is fastened to the stud bolt in a condition in which the stud bolt is passed through the bolt insertion hole of the L-shaped terminal, and that the L-shaped terminal is attached to the terminal attachment portion in a condition in which the wire connection portion of the L-shaped terminal is disposed on a first peripheral wall portion side of the box body,
wherein the terminal cover is hingedly connected to the box body via a hinge portion extending in a direction orthogonal to the first peripheral wall portion of the box body, and the terminal cover is pivotable about the hinge portion between an open condition in which the terminal attachment portion is exposed to the outside, and a closed condition in which the terminal attachment portion is covered,
the terminal cover includes a top cover configured to cover a bolt fastening portion of the connection portion between the stud bolt and the L-shaped terminal, and a side cover configured to cover the wire connection portion of the L-shaped terminal,
the side cover includes: a front-surface cover wall configured to cover the wire connection portion of the L-shaped terminal from an outer circumference side of the first peripheral wall portion; a side-surface cover wall configured to cover a front side surface of two side surfaces of the wire connection portion, the front side surface being located spaced apart from the hinge portion; and an opening portion configured to prevent interference between the side cover and the L-shaped terminal when the terminal cover is pivoted about the hinge portion, and
a protruding wall portion configured to cover the opening portion of the terminal cover located in the closed condition protrudes from the first peripheral wall portion of the box body.

2. The electrical junction box according to claim 1, wherein
a lock portion configured to allow the terminal cover located in the closed condition to be detachably fitted to a locked portion on the box body is formed on the top cover of the terminal cover.

3. The electrical junction box according to claim 1, wherein
the protruding wall portion protruding from the first peripheral wall portion is formed using a wall portion of another functional member provided at the first peripheral wall portion.

4. The electrical junction box according to claim 1, comprising an upper cover configured to cover an upper opening portion of the box body,
wherein a side cover covering portion including three wall portions configured to cover, from the outside, the front-surface cover wall, the side-surface cover wall, and the opening portion, respectively, of the side cover of the terminal cover is provided in the upper cover.

* * * * *